United States Patent
Muthiah

(10) Patent No.: US 11,409,468 B2
(45) Date of Patent: Aug. 9, 2022

(54) STORAGE SYSTEM AND METHOD FOR USING PROACTIVE DEVICE TIMEOUT INFORMATION

(71) Applicant: Western Digital Technologies, Inc., San Jose, CA (US)

(72) Inventor: Ramanathan Muthiah, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 62 days.

(21) Appl. No.: 16/891,683

(22) Filed: Jun. 3, 2020

(65) Prior Publication Data

US 2021/0382649 A1 Dec. 9, 2021

(51) Int. Cl.
*G06F 3/06* (2006.01)

(52) U.S. Cl.
CPC .......... *G06F 3/0659* (2013.01); *G06F 3/0619* (2013.01); *G06F 3/0679* (2013.01); *G06F 2212/7202* (2013.01)

(58) Field of Classification Search
CPC .... G06F 3/0659; G06F 3/0619; G06F 3/0679; G06F 221/7202
See application file for complete search history.

(56) References Cited

U.S. PATENT DOCUMENTS

| 6,047,343 A | 4/2000 | Olarig | |
| 8,255,618 B1 * | 8/2012 | Borchers | G06F 13/1642 711/103 |
| 8,495,222 B2 | 7/2013 | Yamamoto | |
| 2005/0216664 A1 * | 9/2005 | Taninaka | H04L 41/082 711/114 |
| 2012/0005404 A1 * | 1/2012 | Raz | G06F 12/0246 711/103 |
| 2013/0054871 A1 * | 2/2013 | Lassa | G06F 3/061 711/103 |
| 2015/0220278 A1 | 8/2015 | Sarcone et al. | |
| 2017/0322726 A1 * | 11/2017 | Walker | G06F 3/0688 |
| 2019/0079676 A1 * | 3/2019 | Seo | G06F 13/4234 |
| 2019/0265907 A1 * | 8/2019 | Yang | G06F 3/0659 |
| 2020/0301606 A1 * | 9/2020 | Muthiah | G06F 3/0688 |

FOREIGN PATENT DOCUMENTS

WO WO 2008/070053 A2 6/2008

OTHER PUBLICATIONS

International Search Report completed May 2, 2021 for International Application No. PCT/US2021/016180.
Written Opinion completed May 2, 2021 for International Application No. PCT/US2021/016180.
Israel Patent Office Search Strategy completed May 2, 2021 for International Application No. PCT/US2021/016180.

* cited by examiner

Primary Examiner — Kalpit Parikh
(74) Attorney, Agent, or Firm — Crowell & Moring LLP

(57) ABSTRACT

A storage system and method for using proactive device timeout information are provided. In one embodiment, a storage system is provided comprising a memory and a controller. The controller is configured to receive a command from a host; determine whether the command can be executed within a time-out window; and in response to determining that the command cannot be executed within the time-out window, send a request to the host to extend the time-out window. Other embodiments are provided.

20 Claims, 8 Drawing Sheets

STORAGE SYSTEM AND METHOD FOR USING PROACTIVE DEVICE TIMEOUT INFORMATION

BACKGROUND

A host can send read and write requests to a storage system to read data from and store data in a memory of the storage system. A specification under which the storage system and host operate can specify a time period for the storage system to complete a command sent by the host. If the command is not executed within that time period, the storage system can be considered to have timed-out.

DETAILED DESCRIPTION

Overview

Figure 1A:
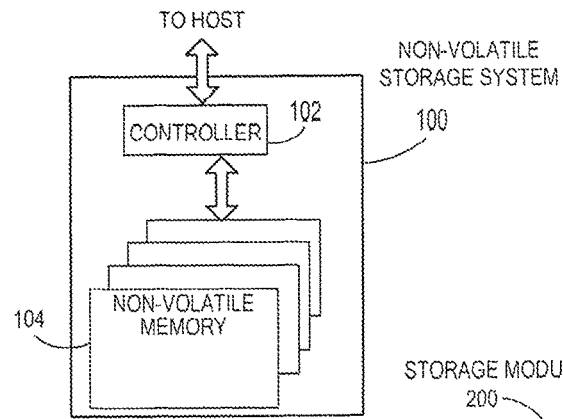
FIG. 1A is a block diagram of a non-volatile storage system of an embodiment.

By way of introduction, the below embodiments relate to a storage system and method for using proactive device timeout information. In one embodiment, a storage system is provided comprising a memory and a controller. The controller is configured to receive a command from a host; determine whether the command can be executed within a time-out window; and in response to determining that the command cannot be executed within the time-out window, send a request to the host to extend the time-out window.

In some embodiments, the controller is further configured to determine an amount of time needed to execute the command, and wherein the request to extend the time-out window is based on the determined amount of time.

In some embodiments, the amount of time needed to execute the command is based on one or more of the following: a number of memory channels, a status of a cache, a number of dies in the memory, a time to access a logical-to-physical address table, and a time to transfer data to the host.

In some embodiments, the controller is further configured to wait for acceptance of the request from the host before executing the command.

In some embodiments, the controller is further configured to receive information from the host that the host is configured to receive the request to extend the time-out window.

In some embodiments, the controller is further configured to receive information from the host identifying a length of the time-out window.

In some embodiments, the command comprises one of an initialization command, a read command, or a write command.

In some embodiments, the memory comprises a three-dimensional memory.

In another embodiment, a method is provided that is performed in a storage system comprising a memory. The method comprises: determining whether a set of atomic operations can be executed within a predetermined amount of time; and in response to determining that the set of atomic operations cannot be executed within the predetermined amount of time, send a request to the host for an extension of time.

In some embodiments, the method further comprises determining an amount of time needed to execute the set of atomic operations, wherein the request for the extension of time is based on the determined amount of time.

In some embodiments, the amount of time needed to execute the set of atomic operations is based on one or more of the following: a number of memory channels, a status of a cache, a number of dies in the memory, a time to access a logical-to-physical address table, and a time to transfer data to the host.

In some embodiments, the method further comprises executing the set of atomic operations only after receiving confirmation that the host granted the request for the extension of time.

In some embodiments, the method further comprises receiving information from the host that the host is able to receive the request for the extension of time.

In some embodiments, the method further comprises receiving information from the host identifying the predetermined amount of time.

In another embodiment, a storage system is provided comprising: a memory; means for determining whether a command received from a host can be executed within a time-out window; and means for, in response to determining that the command cannot be executed within the time-out window, sending a request to the host to extend the time-out window.

In some embodiments, the storage system further comprises means for determining an amount of time needed to execute the command, and wherein the request to extend the time-out window is based on the determined amount of time.

In some embodiments, the amount of time needed to execute the command is based on one or more of the following: a number of memory channels, a status of a cache, a number of dies in the memory, a time to access a logical-to-physical address table, and a time to transfer data to the host.

In some embodiments, the storage system further comprises means for waiting for acceptance of the request from the host before executing the command.

In some embodiments, the storage system further comprises means for receiving information from the host that the host is configured to receive the request to extend the time-out window.

In some embodiments, the storage system further comprises means for receiving information from the host identifying a length of the time-out window.

Other embodiments are possible, and each of the embodiments can be used alone or together in combination. Accordingly, various embodiments will now be described with reference to the attached drawings.

Embodiments

Figure 1B:
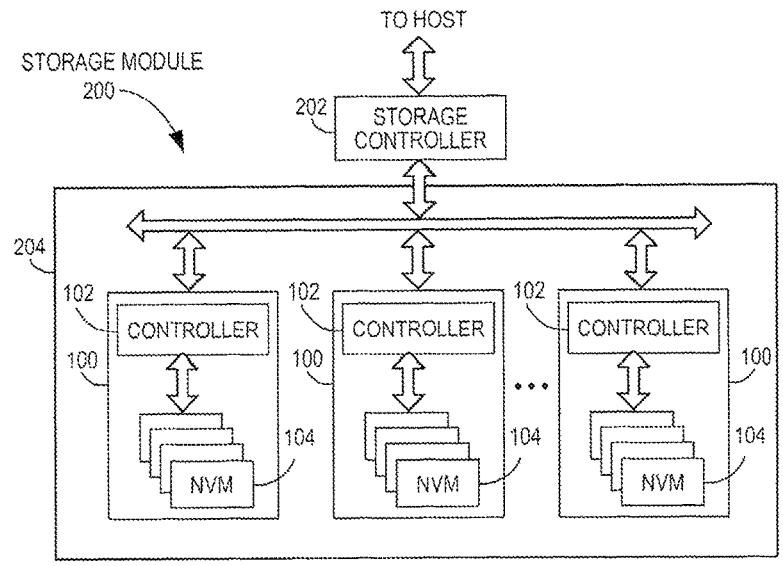
FIG. 1B is a block diagram illustrating a storage module of an embodiment.
Figure 1C:
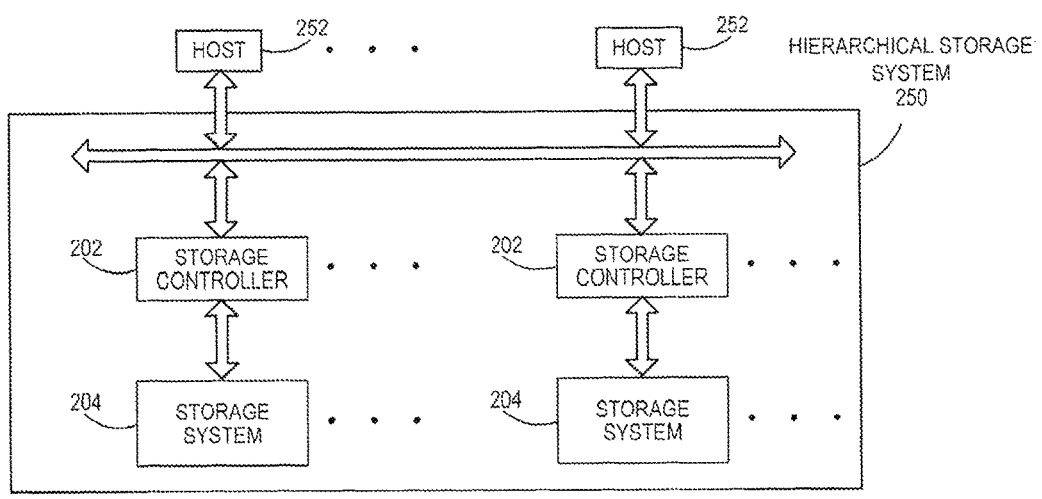
FIG. 1C is a block diagram illustrating a hierarchical storage system of an embodiment.

Storage systems suitable for use in implementing aspects of these embodiments are shown in FIGS. 1A-1C. FIG. 1A is a block diagram illustrating a non-volatile storage system 100 according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card based system, such as a secure digital (SD) or a micro secure digital (micro-SD) card. In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), 2, 4, 8 or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
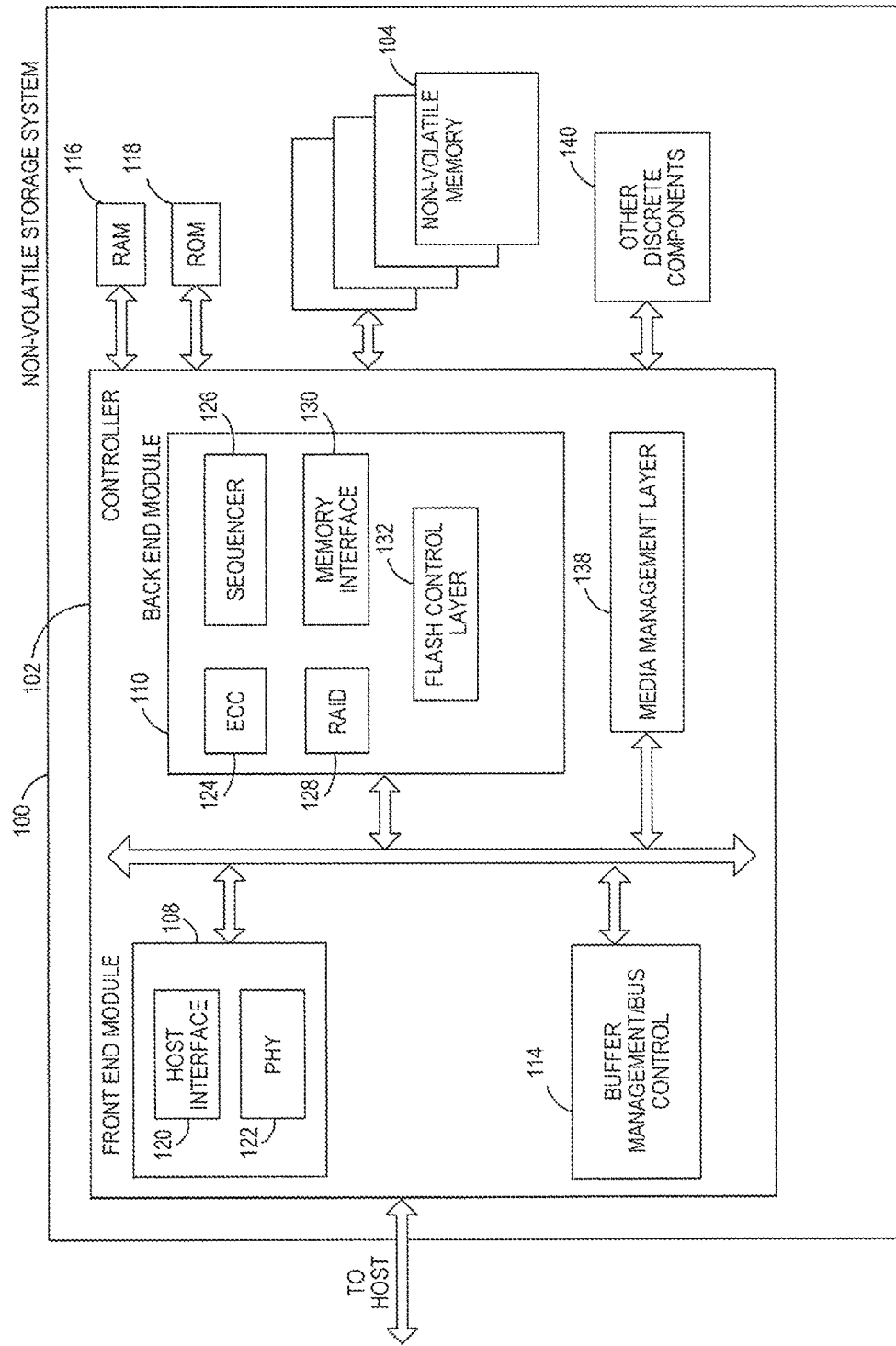
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
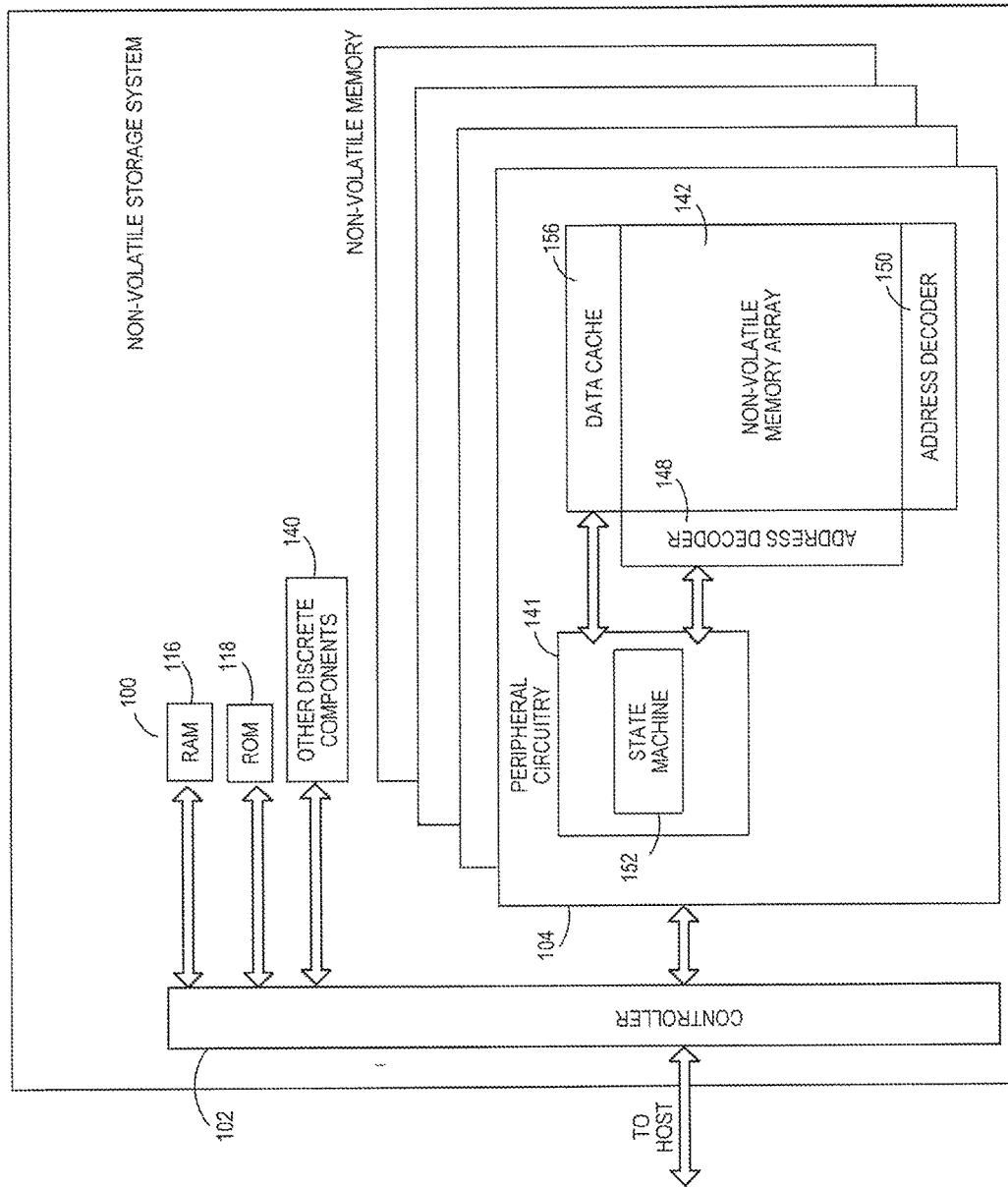
FIG. 2B is a block diagram illustrating components of the non-volatile memory storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two dimensional and/or three dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may only be written in multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
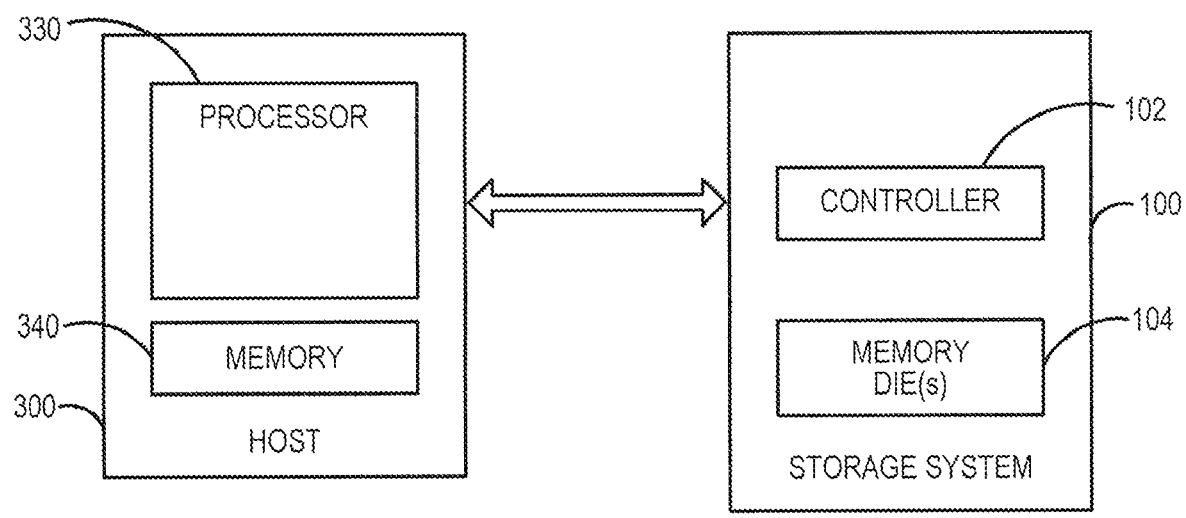
FIG. 3 is a block diagram of a host and storage system of an embodiment.

Turning again to the drawings, FIG. 3 is a block diagram of a host 300 and storage system 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises a processor 330 and a memory 340. In one embodiment, computer-readable program code stored in the host memory 340 configures the host processor 330 to playback media read from the memory 104 of the storage system 100.

The host 300 and storage system 100 can operate under a protocol, such as the Secure Digital (SD), SD-Express, or embedded Multi-Media Controller (eMMC) protocol. The protocol can specify timeout criteria for a response during both initialization and operation of the storage system 100 (which will sometimes be referred to herein as the device or the memory device). Whereas performance scale-up is required to cater to the next generation of protocols (e.g., from SD to SD-Express), the strict timeout criteria can be a hurdle for storage system handling in high-end architectures. Predominantly, many timeout criteria were designed for Class 2 (a two megabit per second (MBPS) minimum write speed) or Class 4 (four MBPS minimum write speed) devices during the early 2000's, which are not relevant today.

Changing the timeout considerations for subsequent specifications through simply raising the limits is difficult owing to compatibility issues, such as compatibility of an old device with a new host. Millions of SD/eMMC devices are already in the market using one of existing SD specifications. As a result, there is a lot of unnecessary overhead created in firmware (such as forced small garbage collection phases, frequent metadata and control dumps into flash, mandatory small operations (from the device's perspective) atomic operations, phased short initialization, and phased error handling) all to adhere to the protocol timeout limits. The problem is seen during normal working conditions, initialization, and during error handling. That is, to handle timelines, work is forcefully done is small phases with enormous overhead (due to multiple phases) and firmware complexity. For example, a blind block copy can be done is small phases with large overhead due to the firmware complexity to handle several phases of operations. The storage system 100 can perform sector-wise throttling to complete the phases spread over time across multiple sectors. But this comes with the risk of a stop transmission (ST) at any point from the host 300 (e.g., during program failure (PF) handling for that command), which would make sector throttling impossible. Further, a stop transmission necessarily means even less time for the storage system 100 to act before a possible power down from the host 300, and typical sector throttling may not work. The two corner cases (PF and ST together) are almost not affordable to be supported with stricter timelines in typical storage system, and too many such cases lead to poor defects-parts-per-million (DPPM).

Figure 4:
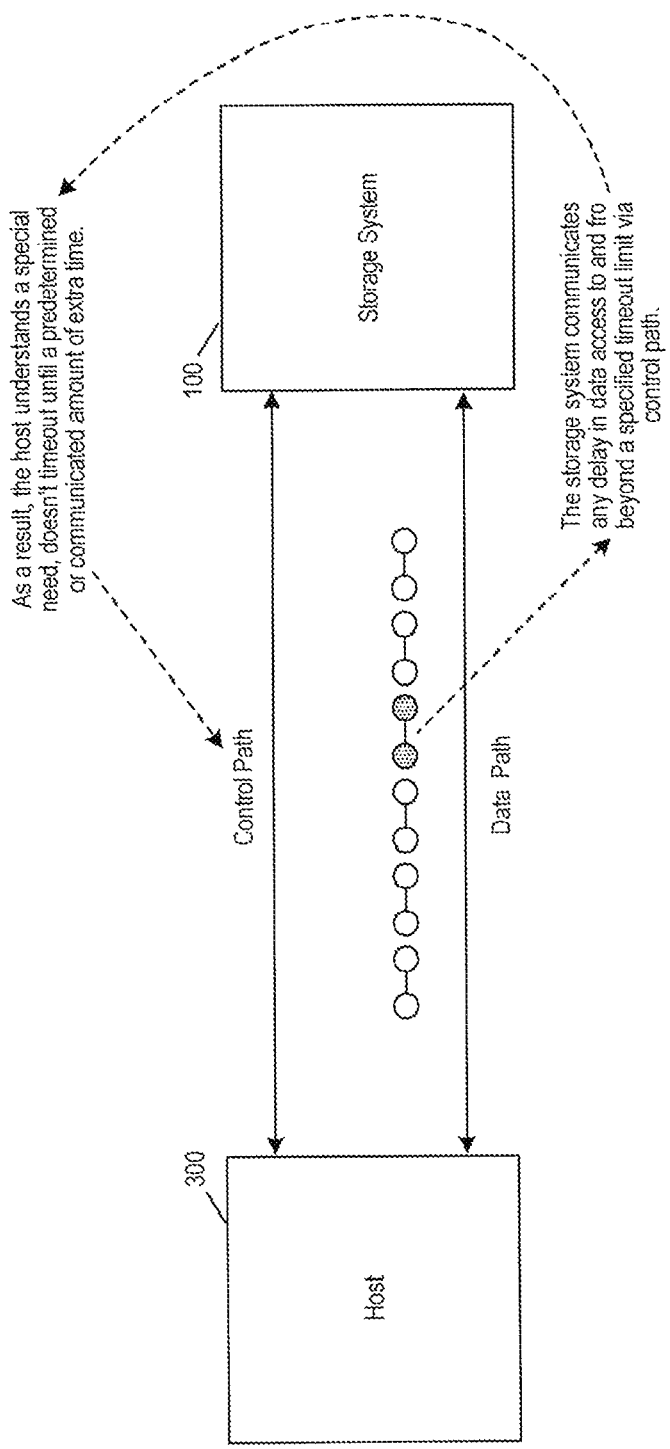
FIG. 4 is a block diagram illustrating control and data paths between a host and storage system of an embodiment.

The following embodiments can be used to address these issues and lead to a better product DPPM and better performance. These embodiments can be used with any suitable specification, such as, but not limited to, SD, eMMC, and SD-Express. FIG. 4 illustrates the general operation of this embodiment. As shown in FIG. 4, control and data paths connect the host 300 and storage system 100. The storage system 100 detects a delay in data access to and from the host 300 that is beyond a specified timeout limit (an illustrated by the hatched circles in the data path) and communicates that delay to the host 300 via the control path. As a result, the host 300 understands a special need exists and does not timeout the storage system 100 until a predetermined or communicated amount of time has elapsed. That is, the control information communicated on the control path enables the host 300 to know that the storage system 100 has not hit a timeout; rather, it is busy doing an internal operation without releasing or consuming any further sectors. The control information and handshake further allow backward compatibility and enable optimum usage of time and resources with minimized overhead. The flexible timeout can optimize DPPM and improve overall performance through reduced overhead. Also, in SD-Express storage systems, these embodiments can help bridge SD and PCIe modes of operation with similar firmware handling of memory errors.

Figure 5:
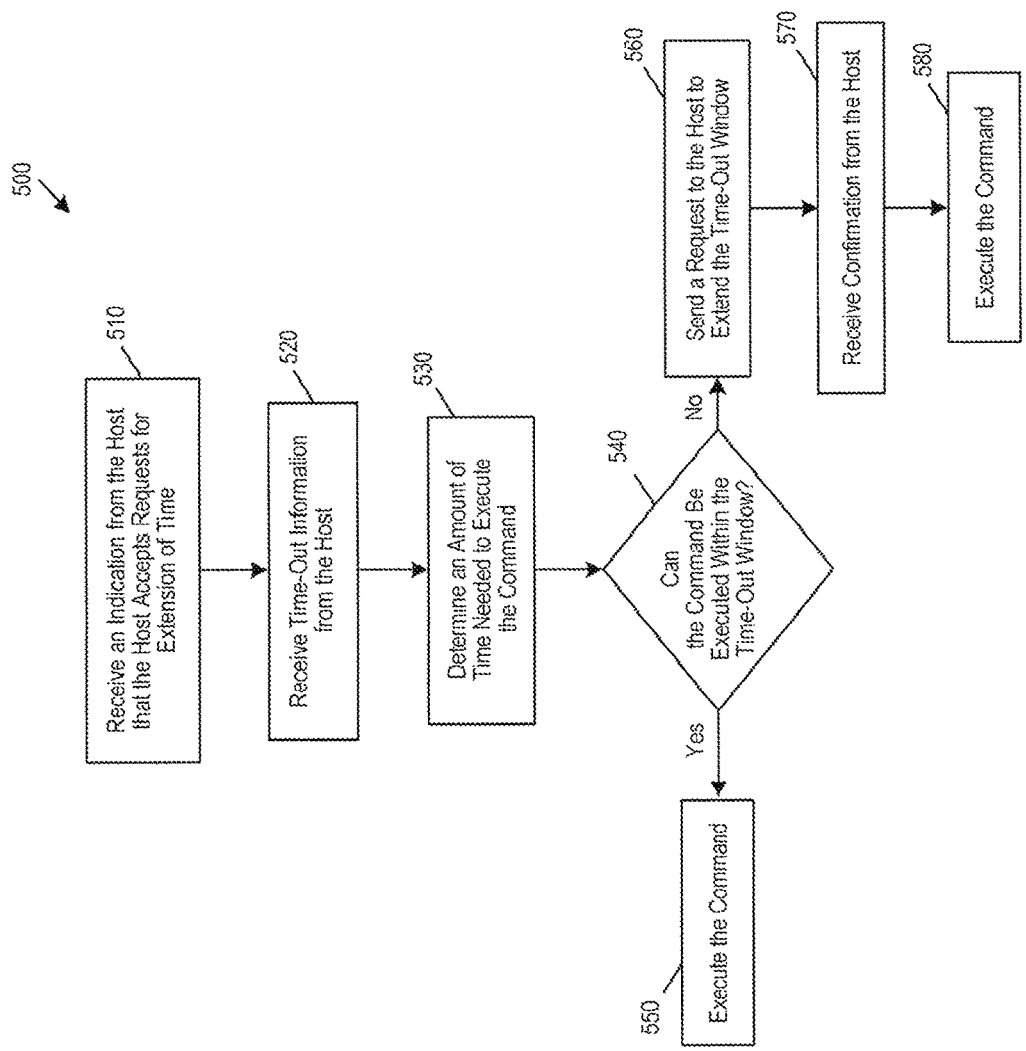
FIG. 5 is a flow chart of a method of an embodiment for using proactive device timeout information.

The flow chart 500 in FIG. 5 illustrates these operations in more detail. As shown in FIG. 5, in one embodiment, the storage system 100 receives an indication from the host 300 that the host 300 is willing to accept requests for extension of time from the storage system 100 (act 510). The possibility of accepting a request for an extension of time can be "pre-confirmed" before the request is actually sent through a host/storage system handshake as part of the specification under which the host 300 and storage system 100 operate. Instead of receiving such an indication, the willingness of the host 300 to accept such requests can be assumed, implied, or expressly stated in the specification. Next, the storage system 100 receives time-out information from the host 300, so the storage system 100 will know how long it has to complete an operation before the host 300 will time out the storage system 100 (act 520). Alternatively, this information can be assumed, implied, or expressly stated in the specification under which the host 300 and storage system 100 operate.

Next, after the storage system 100 receives a command (e.g., an initialization command, a read command, or a write command) from the host 300, the controller 102 in the storage system 100 determines the amount of time needed to execute the command (act 530). The controller 102 can make this determination in any suitable way. For example, in one embodiment, the backend of the controller 102 can have an understanding of the absolute time it takes to complete a firmware task based on a given hardware configuration. In which case, the controller 102 can consider one or more of the following: a number of memory channels (number of flash interface modules (FIMs)), a status (e.g., availability) of a cache, a number of dies in the memory 104, a time to access a logical-to-physical address table, and a time to transfer data to the host 300. Other or different factors can be considered.

The controller 102 then determines whether the command can be executed within the time-out window (act 540). If the command can be executed within the time-out window, the command is executed (act 550). In one embodiment, if the command cannot be executed within the time-out window, the controller 102 sends a request to the host 300 to extend the time-out window (act 560). The controller 102 can inform the host 300 of a possible extended latency for specific sectors beyond the existing specification through a soft or hardwire control interface.

Figure 6:
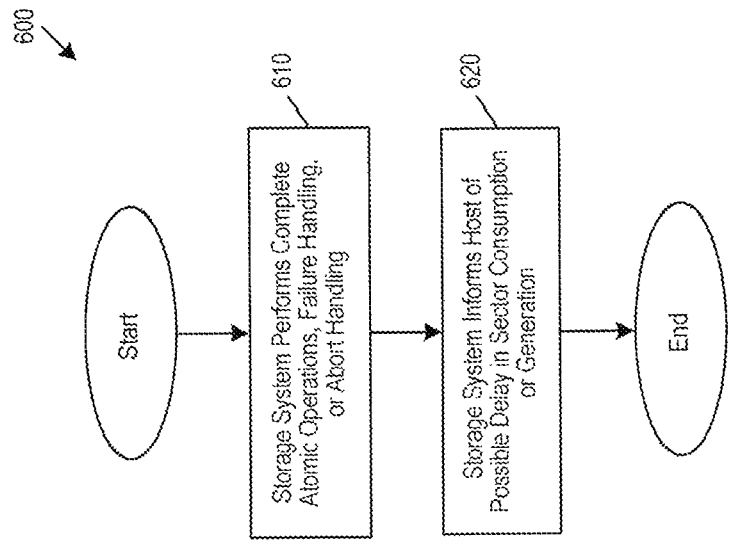
FIG. 6 is a flow chart of a method of an embodiment for communicating control information.

In one embodiment, if the command cannot be executed within the time-out window, the controller 102 does not provide/consume a data sector, but rather informs the host 300 of the possible latency to provide/consume the next sector. Some garbage collection phases take more time than program failure handling or write abort handling, which are all complex atomic operations from the storage system's perspective, and are dealt with using a one-time blind copy or relocation. The controller 102 can inform the host 300 of the latency before triggering such an operation to avoid timeout. This is illustrated in the flow chart 600 in FIG. 6. As shown in FIG. 6, when the storage system 100 performs complete atomic operations, a failure handling operation, or an abort handling operation (act 610), it informs the host 300 of a possible delay in sector consumption or generation (act 620).

The request sent to the host 300 can specify an amount of time that the controller 102 wants to extend the time-out window by (e.g., based on its determination of how long it will take to execute the command). Alternatively, a predetermined extension time may be assumed, in which case the request would not specify an extension time. That is, the extending time margin can be communicated or provided for in the protocol specification, which can be decided during protocol standardization. After confirmation of the request is received from the host 300 (act 570), the command is executed (act 580). Alternatively, the controller 102 can assume that the request will be granted, and proceed with executing the command without awaiting confirmation from the host 300.

As an example, consider the situation of a write command with a 250 millisecond (ms) sector-wise time allowance. The storage system 100 can communicate/request an extra 50 ms for a specific sector in a given command according to its latency evaluation. The storage system 100 can use this time (250 ms+50 ms=300 ms) for longer operations, which is better accomplished (from the storage system's perspective) if performed atomically (e.g., blind block copy which is usually performed atomically during a program failure (PF) or an enhance post-write read (EPWR) failure).

On receiving the request for the extension of time via control information on the controller path, the host 300 does not timeout the storage system 100 but rather waits for an extended requested time, only beyond which it may consider a timeout. Because it received the request from the storage system 100, the host 300 knows that the storage system 100 is busy and has not hit a timeout state. As such, the host 300 may opt to not shut down or put the storage system 100 in a low-power mode during this latency communication. This is illustrated in the flow chart 700 in FIG. 7.

Figure 7:
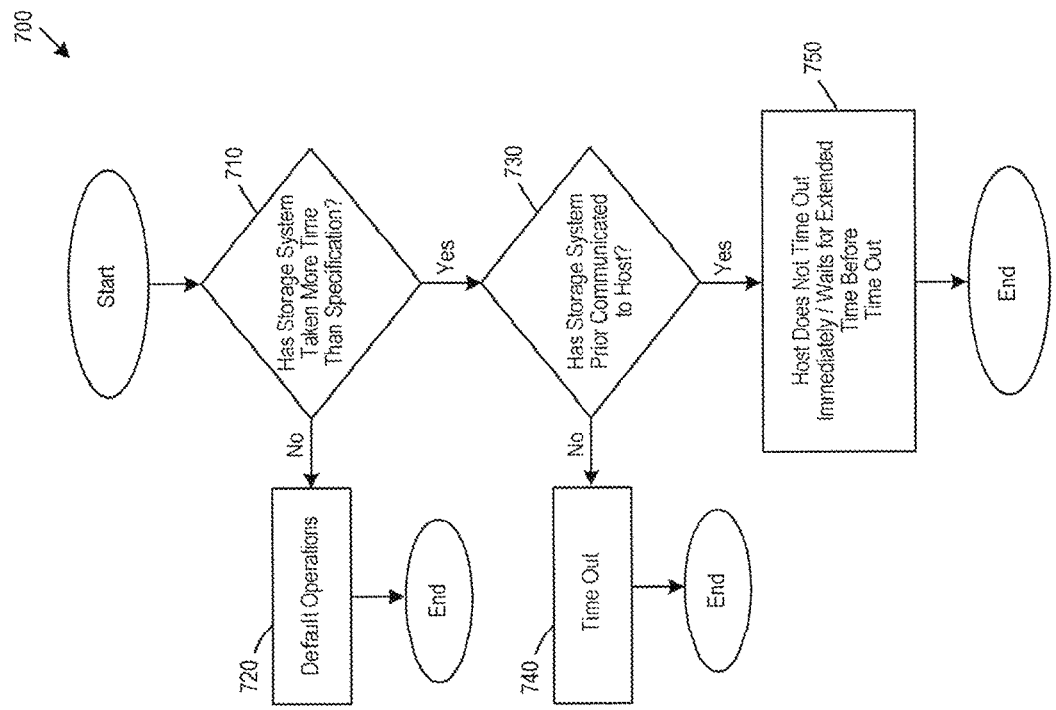
FIG. 7 is a flow chart of a method of an embodiment for using proactive device timeout information.

As shown in FIG. 7, the host 300 determines if the storage system 100 has taken more time to complete an operation than is specified in its specification (act 710). If it has not, default operations occur (act 720). If it has, the host 300 determines if the storage system 100 has communicated this delay to the host 300 (act 730). If it has not, the host 300 times out the storage system 100 (act 740). If it has, the host 300 does not time out the storage system 100 immediately but rather waits an extended period of time before timing out the storage system 100 (act 750).

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A storage system comprising:
   a memory; and
   a controller configured to:
   receive a command from a host to access a plurality of sectors in the memory;
   determine that an internal operation is being performed in a specific sector of the plurality of sectors, which introduces a latency in releasing the specific sector for use by the host;
   determine that, because of the latency, the command from the host cannot be executed in the specific sector within a sector-wise time allowance specified for the storage system;
   in response to determining that the command from the host cannot be executed in the specific sector within the sector-wise time allowance, send a request to the host to extend the sector-wise time allowance only for the specific sector, and
   in response to receiving confirmation from the host that the sector-wise allowance time period has been extended, execute the command.

2. The storage system of claim 1, wherein the request is based on an amount of time needed to execute the command.

3. The storage system of claim 2, wherein the amount of time is determined based on one or more of the following: a number of memory channels, a status of a cache, a number of dies in the memory, a time to access a logical-to-physical address table, and a time to transfer data to the host.

4. The storage system of claim 1, wherein the controller is further configured to wait for the confirmation before executing the command.

5. The storage system of claim 1, wherein the controller is further configured to receive information from the host that the host is configured to receive the request.

6. The storage system of claim 1, wherein the controller is further configured to receive information from the host identifying the sector-wise time allowance.

7. The storage system of claim 1, wherein the command comprises one of an initialization command, a read command, or a write command.

8. The storage system of claim 1, wherein the memory comprises a three-dimensional memory.

9. The storage system of claim 1, wherein the controller is further configured to detect a delay to or from the host beyond a specified limit.

10. The storage system of claim 9, wherein the controller is further configured to communicate the detected delay to the host.

11. The storage system of claim 9, wherein the detected delay is due to the internal operation being performed in the storage system.

12. A method comprising:
    performing the following in a storage system comprising a memory, wherein the storage system is in communication with a host:
    receiving a command from the host to access a plurality of sectors in the memory;
    determining that an internal operation is being performed in a specific sector of the plurality of sectors, which introduces a latency in releasing the specific sector for use by the host;
    determining that, because of the latency, the command from the host cannot be executed in the specific sector within a sector-wise time allowance specified for the storage system;
    in response to determining that the command from the host cannot be executed in the specific sector within the sector-wise time allowance, sending a request to the host to extend the sector-wise time allowance only for the specific sector, and
    in response to receiving confirmation from the host that the sector-wise allowance time period has been extended, executing the command.

13. The method of claim 12, wherein the request is based on an amount of time needed to execute the command.

14. The method of claim 13, wherein the amount of time is determined based on one or more of the following: a number of memory channels, a status of a cache, a number of dies in the memory, a time to access a logical-to-physical address table, and a time to transfer data to the host.

15. The method of claim 12, further comprising executing the set of atomic operations only after receiving the confirmation.

16. The method of claim 12, further comprising receiving information from the host that the host is able to receive the request.

17. The method of claim 12, further comprising receiving information from the host identifying the sector-wise time allowance.

18. The method of claim 12, further comprising detecting a delay to or from the host beyond a specified limit.

19. The method of claim 18, further comprising communicating the detected delay to the host.

20. A storage system comprising:
    a memory;
    means for receiving a command from the host to access a plurality of sectors in the memory;
    means for determining that an internal operation is being performed in a specific sector of the plurality of sectors, which introduces a latency in releasing the specific sector for use by the host;
    means for determining that, because of the latency, the command from the host cannot be executed in the specific sector within a sector-wise time allowance specified for the storage system;
    means for sending a request to the host to extend the sector-wise time allowance only for the specific sector in response to determining that the command from the host cannot be executed in the specific sector within the sector-wise time allowance; and means for executing the command in response to receiving confirmation from the host that the sector-wise allowance time period has been extended.

* * * * *